Nov. 20, 1956
J. W. LITTMAN
2,770,899
DISPLAY DEVICES
Filed Oct. 1, 1953
3 Sheets-Sheet 1
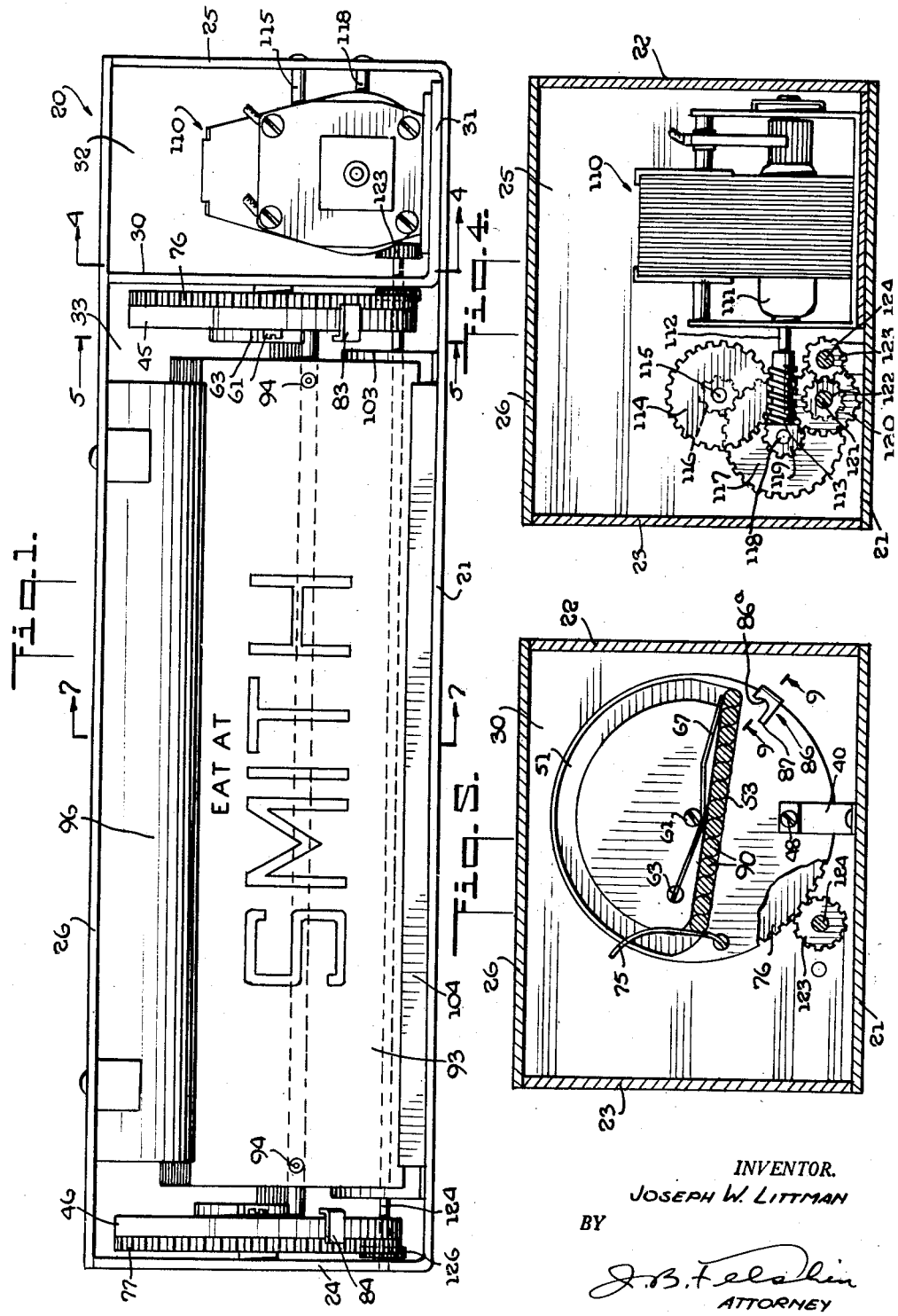
INVENTOR.
JOSEPH W. LITTMAN
BY
J.B. Feldman
ATTORNEY

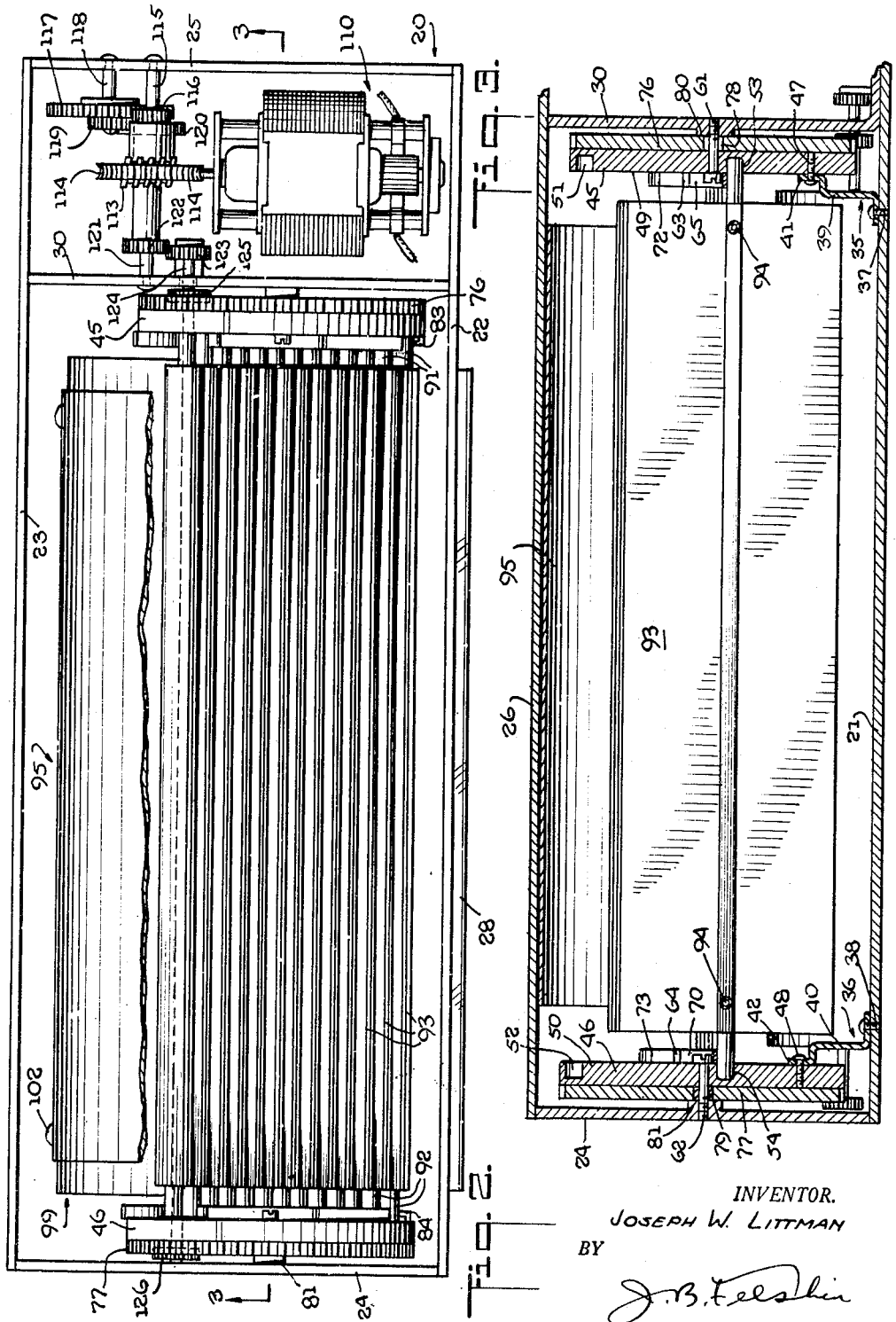

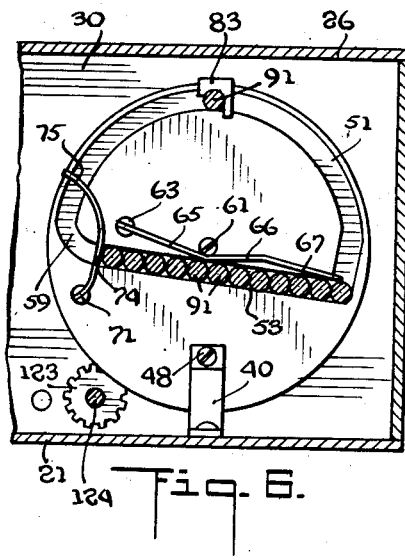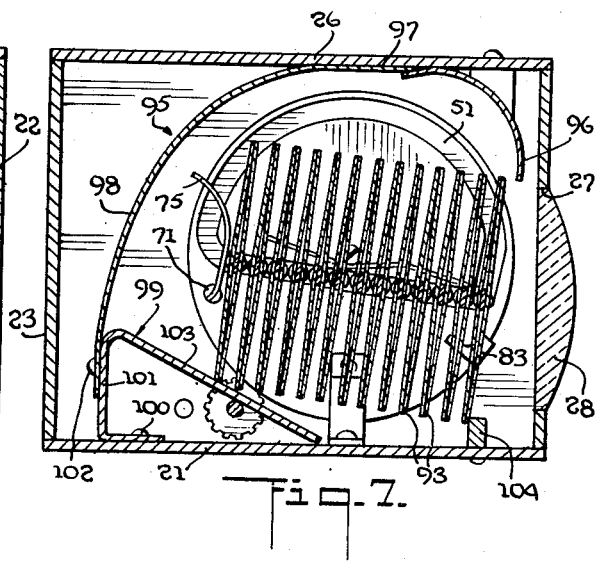

United States Patent Office 2,770,899
Patented Nov. 20, 1956

2,770,899

DISPLAY DEVICES

Joseph W. Littman, Miami Beach, Fla.

Application October 1, 1953, Serial No. 383,495

5 Claims. (Cl. 40—36)

This invention relates generally to display devices, and is particularly directed to changeable signs, and similar displays.

As is well known to those versed in the art, changeable display devices, such as signs and the like, are highly desirable for a number of reasons. The wide variety of unique effects which are possible with moving elements, as well as mere movement itself, serve to attract and retain the attention of viewers. Further, as space is relatively expensive in good advertising locations, the use of changeable display devices serves to effectively transmit a plurality of messages from a single location. There are, of course, many other advantages to changeable display devices which are well known in the art.

The particular embodiment of the present invention, which is illustrated in the drawings and which will be described hereinafter in greater detail, comprises generally a plurality of display elements normally arranged one behind the other and movably supported by novel cam means, and operating means adapted to move the frontmost display element along the cam means to a position rearwardly of the remaining cam elements, so that all of the display elements are successively and continuously displaced from a visible position rearwardly to a concealed position.

It is an object of the present invention to provide a changeable display device of the type described, which is relatively small in size and compact in construction, and which is provided with novel means for displaying a large number of individual signs or display elements.

It is another object of the present invention to provide a changeable display device of the type described, in which the period of time consumed in the changing of displays is negligible, as a rearward displacement of the frontmost display element immediately presents the next frontmost display element to view, and in which all of the display elements travel in a closed path so that the device may operate continuously for an indefinite length of time.

It is a more particular object of the present invention to provide a changeable display device having the characteristics mentioned in the foregoing paragraphs in which the display elements are turned or rotated approximately one-half of a revolution during their rearward displacement so that each display element will appear successively in its turn, and upon each appearance will alternately present is opposite sides to view.

It is a further object of the present invention to provide a changeable display device of the type described which is simple and reliable in operation, durable in construction, and which can be manufactured and sold at a reasonable cost.

Other objects of the present invention will become apparent upon reading the following specification and referring to the accompanying drawings, which form a material part of this disclosure.

The invention accordingly consists in features of construction, combinations of elements and arrangements of parts, which will be exemplified in the construction hereinafter described, and of which the scope will be indicated by the appended claims.

In the drawings:

Fig. 1 is a front elevational view showing a changeable display device constructed in accordance with the present invention, the housing front wall being removed to expose the operating mechanism;

Fig. 2 is a top plan view, partially broken away, of the device shown in Fig. 1, the housing top wall being removed for purposes of clarity;

Fig. 3 is a sectional elevational view taken substantially along the line 3—3 of Fig. 2;

Fig. 4 is a transverse, sectional elevational view taken substantially along the line 4—4 of Fig. 1;

Fig. 5 is a transverse, sectional elevational view taken substantially along the line 5—5 of Fig. 1;

Fig. 6 is a partial sectional view similar to Fig. 5 showing a later stage of the operating cycle;

Fig. 7 is a sectional elevational view taken substantially along the line 7—7 of Fig. 1;

Fig. 8 is a sectional view similar to Fig. 7 showing the operation at a later stage in the cycle;

Fig. 9 is a fragmentary sectional view taken substantially along the line 9—9 of Fig. 5; and Fig. 10 is a partial, transverse sectional view showing a slightly modified form of the present invention.

Referring now more particularly to the drawings, the embodiment of the invention illustrated therein comprises a generally rectangular housing, generally designated 20, having a bottom wall 21, and upstanding front and rear walls 22 and 23 on the bottom wall, side walls 24 and 25 extend between the front and rear walls, and a top wall 26 is spaced above the bottom wall 21 and extends between the upper edges of the front, rear and side walls. The front wall 22 is formed with a generally rectangular window or opening 27 which is preferably closed by a glass 28. If desired, the glass may have magnifying power, as shown in Figs. 7 and 8. An upstanding internal partition wall 30 is fixedly positioned adjacent to and spaced from the side wall 25, and is formed with a horizontal extension 31 seated on the bottom wall 21 and preferably secured thereto by any suitable means. It will now be seen that the partition wall 30 subdivides the housing 20 into a relatively small compartment 32 and a relatively large compartment 33, the window 27 opening into the latter compartment.

Disposed within the larger housing compartment 33 adjacent to and spaced from each of the walls 24 and 30, are a pair of upstanding brackets 35 and 36. As best seen in Fig. 3, each of the brackets 35 and 36 has its lower end fixedly secured to the bottom housing wall 21 by screws or fasteners 37 and 38, the brackets extending vertically upwards as at 39 and 40, and having their upper ends outwardly offset as at 41 and 42. Also within the larger housing compartments 33, adjacent to and spaced from the walls 30 and 24 are a pair of vertically disposed disc-like cam elements 45 and 46, which have their lower portions fixedly secured to the brackets 35 and 36 by screws or fasteners 47 and 48. Thus, the cam elements 45 and 46 are arranged in parallel spaced relation with respect to each other, each adjacent to one end of the larger housing compartment 33. The facing surfaces 49 and 50 of the cam elements 45 and 46 are each formed with an arcuate, substantially semi-circular marginal groove 51 and 52, respectively. The arcuate grooves are each formed in the upper portion of their respective cam element, and extend rearwardly from a point adjacent to the window 27. Also formed in the facing surfaces 49 and 50 of the cam elements 45 and 46 are substantially straight, chordal or connecting grooves 53 and 54, respectively, which decline forwardly and communicate between the rearward and forward portions of their associated arcuate grooves. As is now apparent, the cam elements 45 and 46 have their inner faces 49 and 50 substantially identically formed, so that it is sufficient to illustrate only the face 49 in the drawings.

In Figs. 2, 6, 7 and 8 are shown an inner face 49 of the cam element 45, which will now be described in further detail, it being appreciated that such description applies equally well to the inner face 50 of cam element 46. The rearward portion of the arcuate groove 51 curves downwardly and forwardly as at 59 to merge with the rearward portion of the substantially straight connecting groove 53. A forward portion of the connecting groove 53 opens into a substantially straight upwardly and forwardly extending groove portion 60, which merges at its upper end with the forward portion of the arcuate groove 51.

Bolts 61 and 62 extend outwardly through the centers of the cam elements 45 and 46, respectively, and are fixedly secured in the walls 30 and 24, to rigidify the cam elements, and for other purposes which will soon become apparent. Fixed upon the inner faces 49 and 50 of the cam elements 45 and 46, and disposed within the closed paths defined by the arcuate and chordal grooves, are lugs or projections 63 and 64 which serve to anchor one end of the leaf springs 65 and 70, respectively. As the leaf springs 65 and 70 are substantially identical in construction, a description of one will suffice. The leaf spring 65 extends forwardly from its anchoring lug 63 below the head of the bolt 61, and has its intermediate portion 66 inclined upwardly and its forward end portion 67 extending slightly downwardly. The forward end portion 67 of the leaf spring 65 resiliently presses downwardly, as the intermediate portion of the leaf spring is rigidly held down by the head of the pin 61. Also fixed on the inner faces of each of the cam elements 45 and 46 are lugs 71, arranged below the rearward portion of the chordal grooves 53 and 54, the corresponding lug on the cam element 46 being hidden from view in the drawings. The lugs 71 on each of the cam elements 45 and 46 serve to anchor the lower ends of the leaf springs 72 and 73, respectively, which springs extend upwardly across the chordal grooves as at 74, and thence rearwardly and upwardly across the rearward portion of the arcuate groove, as at 75. It will be noted that the leaf springs 72 and 73 may be deflected to a position rearwardly of the arcuate and chordal grooves.

Rotatably supported on each of the bolts 61 and 62, intermediate the cam element 45 and the partition wall 30, and the cam element 46 and the end wall 24, are toothed disc elements or spur gears 76 and 77, respectively. The spur gears 76 and 77 are provided with bushings 78 and 79, respectively, and spaced from their adjacent walls by washers or bosses 80 and 81. Thus, the toothed members or gears 76 and 77 are mounted coaxially with each other and the cam elements, and are rotatable about the axis of the latter.

Secured to each of the gears 76 and 77, and arranged in alignment with each other, are U-shaped fingers 83 and 84, respectively. As both of the fingers are identical, a description of one will suffice. The U-shaped finger 83 has its bight portion 84 arranged outwardly of the peripheral edge of the cam element 45, and its leg portions on opposite sides of the cam element. Thus, the leg portion 85 is fixedly secured to the gear 76, see Fig. 9, and the leg portion 86 is disposed inwardly of the inner face 49 of the cam element 45. The leg portion 86 of the finger 83 is provided with an inwardly facing curved seat 86a and an inwardly extending tongue 87 on one side of the seat.

A plurality of parallel rods 90 have their opposite ends 91 and 92 extending into and slidable along the chordal grooves 53 and 54 of the cam elements 45 and 46, see Fig. 2. Thus, the rods 90 are arranged substantially one behind the other and supported in the chordal grooves 53 and 54. On each of the rods 90, intermediate the opposite ends thereof, is mounted, by any suitable means, a display element 93, said display elements extending approximately equal distances above and below their supporting rods. In the illustrated embodiment, see Fig. 7, each of the display elements 93 includes a pair of stiff sheets arranged in facing relation on opposite sides of the associated rod and fixedly secured thereto, as by grommets 94 or the like. By this construction, both sides of the display element may be decorated, for reasons which will appear presently. While the display elements have been described as mounted on rods extending between the cam elements, it is appreciated that the display elements could equally well be formed of rigid sheets having end members extendable into and supported by the cam element grooves.

Also mounted in the larger housing compartment 33 is a curved sheet or guide member 95 which has its forward portion 96 positioned adjacent to and above the front wall window 27. The guide member or sheet 95 curves upwardly and rearwardly generally following the curvature of the arcuate groove 51, being secured to the top wall 26 by any suitable means at 97, and, thence, curving downwardly and rearwardly as at 98. Below and to the rear of the cam elements 45 and 46, and secured to the bottom housing wall 21, is a generally triangularly shaped sheet or guide member 99. The sheet or guide member 99 is fixed to the bottom wall 21 by fasteners or bolts 100, and has an upstanding rear wall 101 which is fixedly secured to the lower end of the guide member 95, as by fasteners 102. The sheet 99 includes an inclined portion 103 which extends forwardly and downwardly from the rear portion of the guide member 95, for purposes which will become apparent hereinafter. A bar 104 extends longitudinally of the housing adjacent to the window 27 and is fixedly secured to the bottom wall 21 by any suitable fastening means, also for a purpose appearing hereinafter.

Disposed within the smaller housing compartment 32 is a motor 110 having an armature 111 and a drive shaft 112. In order to obtain maximum speed reduction, a worm gear 113 is fixed on the drive shaft 112 and drives a relatively large spur gear 114 which is mounted on the shaft 115, the latter being journalled in the housing wall 25. Also mounted on the shaft 115 is a relatively small gear or pinion 116 which drives the larger gear 117, the latter being mounted on a shaft 118, which is also journalled in the housing wall 25. A pinion 119 is keyed to the shaft 118 and drives the gear 120 which is mounted on the shaft 121, the latter being journalled in the wall 30. Also mounted on the shaft 121 is a pinion 122 which is in meshing engagement with the pinion 123. The latter pinion 123 is keyed to a shaft 124 which extends through the wall 130, being journalled therein, and extends to the wall 24, also being journalled therein. As seen in Figs. 7 and 8, the shaft 124 extends below the inclined portion 103 of the triangular sheet 99. Keyed to the shaft 124 adjacent to the walls 24 and 30 are gears 125 and 126 which mesh, respectively, with the gears 76 and 77, and drive the latter upon rotative movement of the motor armature 111.

In operation, the rods 90 and their respective display elements 93 are normally supported in the chordal grooves 53 and 54 so that the frontmost display element is exposed through the glass 28. As the gears 76 and 77 rotate in a counterclockwise direction, see the arrow in Fig. 5, the fingers 83 and 84 will engage the end portions of the frontmost rod to move the latter rearwardly along the arcuate groove 51. That is, the end portions of the frontmost rod are received in the seat 86a of the fingers and carried by the tongues 87 upwardly and rearwardly along the arcuate grooves. While the springs 65 and 70 normally retain the frontmost rod in the chordal grooves, the fingers 83 and 84 force the rod upwardly to deflect the spring away from the rod. When the frontmost rod is removed from the chordal grooves, the springs 72 and 73 resiliently bear upon the rearmost rod to urge the rods forwardly in the chordal grooves.

As seen in Fig. 8, the guide member 95 is constructed to constrain the rotative movement of the display elements 93 upon their travel along the arcuate grooves 51 and 52. That is, the guide member 95 causes each of the display elements 93 to effect approximately one-half turn during its travel along the arcuate grooves, so that the surface of the display element 93 which was exposed through the window 27 will be facing rearwardly when the display element is moved to a position behind the other display elements. As the rods are moved rearwardly along the arcuate grooves 51 and 52, their end portions engage with the upper ends of the leaf springs 72 and 73 to deflect the latter rearwardly and permit movement of the rods into the rearmost portion of the chordal grooves 53 and 54.

When the display element 93 enters the rearmost portion of the chordal grooves 53 and 54, the lower edge of the display element engages with the rearwardly inclined sheet portion 103 to limit rotative movement of the display element in the clockwise direction. Simultaneously, the lower edge of the frontmost display element is in abutting engagement with the bar 104 so as to limit rotative movement of the display elements in the counterclockwise direction. Thus, as the display elements are arranged one behind the other in adjacent relation, and as the frontmost and rearmost display elements have their rotative movement restrained in both directions, it follows that all of the display elements are restrained against rotative movement in both directions.

In view of the foregoing, it will now be understood that the device of the present invention will provide twice as many displays as there are display elements. More specifically, each display element will be presented consecutively, and then reversed, so that the opposite sides of each display element will then also be consecutively presented. As this procedure is continuous, the series of display elements will alternately present to view one side and then the other.

In Fig. 10 is shown a slightly modified form of the present invention, wherein it is possible to employ two groups of display elements in cooperating relation. Fig. 10 illustrates a sectional view similar to Figs. 5 and 6, the gear 76' being of larger diameter than the cam element 45'. A second gear 130 is mounted for rotation about the bolt or shaft 131 and is in meshing engagement with the gear 76'. The cam element 132 is fixedly positioned with its center in alignment with the shaft 131 and is formed with an arcuate, substantially semi-circular groove 133, formed on its lower portion. Thus, the arcuate grooves 51' and 133 are bowed away from each other. A downwardly and forwardly extending chordal groove 134 communicates between the rearward and forward portions of the arcuate groove 133, so that the arcuate and chordal grooves 133 and 134 combine to form a closed path. A leaf spring 135 has one end fixed to the cam element 132, the other end serving to resiliently hold the frontmost one of the rods 136 in the chordal groove. A second leaf spring 140 has one end anchored to the cam element 132 and extends downwardly across the chordal groove 134 and rearwardly across the arcuate groove 133, said spring resiliently abutting the rearmost one of the rods 136 to urge the latter forwardly.

The U-shaped fingers 83' and 141 each have one end fixedly secured, respectively, to the gears 76' and 130. The other ends of the fingers 83' and 141 overlie the cam elements 45' and 132, respectively, and function in substantially the same manner as the fingers 83 and 84 in the previously described form of the present invention. It will be noted that the fingers 83' and 141 are spaced inwardly of the root diameter of the gears 76' and 130 so as to freely pass each other during rotation of the gears. This construction is permitted by enlarging the gear diameters, or conversely, by reducing the diameters of the cam elements 45' and 132.

In operation, the fingers 83' and 141 serve to move the frontmost display members rearwardly along the arcuate grooves 51' and 133, and deposit the display members rearwardly of the remaining display members as described hereinbefore.

It will be understood that the display elements carried by the rods 90' and 136 may be decorated so as to cooperate with each other when in the frontmost position. That is, as the movement of the two groups of rods is synchronized by the geared driving connection, the same pair of display elements will always be presented to view simultaneously, if the number of display elements in each group is equal. Of course, various unique effects may be obtained by employing a different number of display elements in each of the groups. It will be seen in Fig. 10 that gear 130 is in meshing engagement with a driving pinion 142, which pinion serves also to drive the gear 76' through the gear 130. It will be understood that the Fig. 10 is only intended to illustrate the manner of employing multiple groups of display elements in a single device, and is to be construed as adapted for use wtih all of the features of the embodiment shown in Figs. 1–9.

From the foregoing, it is seen that the present invention provides a changeable display device which fully accomplishes its intended objects and which is well adapted to meet practical conditions of use.

Although the present invention has been described in some detail by way of illustration and example for purposes of clarity of understanding, it is understood that certain changes and modifications may be made within the spirit of the invention and the scope of the appended claims.

Having thus described my invention I claim as new and desire to protect by Letters Patent of the United States:

1. A changeable display device comprising a housing having a front window, cam members in said housing at opposite sides of said window, similar cam grooves in opposed faces of said cam members, said cam grooves including arcuate groove portions connected by chordal groove portions aligned with said window, reversible display elements having central side projections seated in said grooves, means for selectively engaging projections of a foremost display element and move the same around said grooves, a guide in said housing engageable with a display element to constrain rotation thereof in its movement to effect approximately 180° rotation of said foremost display element whereby each display element is reversed in its movement through said arcuate portions.

2. A changeable display device comprising a housing having a front window, first and second pairs of cam members in said housing, each pair of cam members including cam members at opposite ends of said window, similar cam grooves including arcuate portions connected by chordal portions aligned with said window, chordal portions of said pairs of cam members being adjacent each other and said arcuate portions being remote from each other, a set of reversible display elements disposed between cam members of each pair, display elements of said sets cooperating to form a plurality of composite displays, said display elements having central side projections seated in said grooves, conveying means for each pair of cam members selectively engageable with projections of foremost display elements to move the same around said arcuate grooves, drive means connected to and driving said conveying means in unison whereby the foremost display elements of said sets are moved simultaneously, a guide element in said housing for each pair of cam members, each guide being engageable with a display element to constrain rotation thereof in its movement to effect approximately 180° rotation of said foremost display elements whereby each display element is reversed in its movement through said arcuate portions.

3. In a changeable display device, a housing having a front window, a pair of cam elements fixedly positioned within said housing on opposite sides of said window, each of said cam elements being provided with an arcuate groove extending rearwardly from a point adjacent to said window and a chordal groove communicating between the rearmost and front portions of said arcuate groove, a group of rods arranged one behind the other and each having its end portions extending into and slidable along said chordal grooves, a reversible display element carried by each of said rods, the display element carried by the frontmost rod being visible through said window, a pair of movable fingers each associated with one of said cam elements and engageable with the frontmost of said rods to move the latter and its associated display element along said arcuate grooves to a position rearwardly of the other of said rods, means normally urging said rods along said chordal grooves, mounting means for carrying each of said fingers in the required path, and motor means for effecting movement of said fingers, whereby said rods and their associated displays are successively and continuously displayed from a frontmost, visible position adjacent to said window, to a rearmost position remote from said window, and guide means engaging and constraining said display elements to assure rotative movement during movement of said rod along said arcuate grooves, thereby said display elements are rotated approximately one-half revolution during each cycle of movement to said arcuate grooves to alternatively present opposite sides to view through said window.

4. In a changeable display device, a housing having a front window, a pair of cam elements fixedly positioned within said housing on opposite sides of said window, each of said cam elements being provided with an arcuate groove extending rearwardly from a point adjacent to said window and a chordal groove communicating between the rearmost and front portions of said arcuate groove, a group of rods arranged one behind the other and each having its end portions extending into and slidable along said chordal grooves, a reversible display element carried by each of said rods, the display element carried by the frontmost rod being visible through said window, a pair of movable fingers each associated with one of said cam elements and engageable with the frontmost of said rods to move the latter and its associated display element along said arcuate grooves to a position rearwardly of the other of said rods, means normally urging said rods along said chordal grooves, mounting means for carrying each of said fingers in the required path, and motor means for effecting movement of said fingers, whereby said rods and their associated displays are successively and continuously displayed from a frontmost, visible position adjacent to said window, to a rearmost position remote from said window, and an arcuate guide member extending rearwardly along said arcuate groove from a point adjacent to said window, said guide member engaging and restraining said display elements to rotate said display elements approximately one-half revolution during movement of said rods through said arcuate grooves, whereby said display elements alternatively present opposite sides to view through said window.

5. In a changeable display device, a housing having a front window, a pair of cam elements fixedly positioned within said housing on opposite sides of said window, an arcuate cam surface on each of said cam elements extending rearwardly from a point adjacent to said window, a connecting cam surface on each of said cam elements communicating between the rearmost and frontmost portions of said arcuate cam surface, a plurality of reversible display elements arranged one behind the other between said cam elements and each having end members engaging the connecting cam surfaces of said cam elements, a finger movable along the periphery of each of said cam elements and engageable with end members of the frontmost display element for moving the latter along said arcuate cam surfaces to the position rearwardly of the other of said display elements, resilient means normally urging said display element forwardly along said connecting cam surfaces, and motive means for effective movement of said fingers, whereby said display elements are moved successively and continuously from a frontmost position adjacent to said window to a rearmost position remote from said window, and an arcuate guide member extending rearwardly along said arcuate cam surface from a point adjacent to said window, said guide member engaging and constraining said display elements to rotate said display elements approximately one-half revolution during movement along said arcuate cam surfaces, whereby said display elements alternatively present opposite sides to view through said window.

References Cited in the file of this patent

UNITED STATES PATENTS

| | | |
|---|---|---|
| 633,871 | MacFarland | Sept. 26, 1899 |
| 1,010,219 | Bishop | Nov. 28, 1911 |
| 1,355,664 | Grover | Oct. 12, 1920 |
| 2,209,517 | Flanagan | July 30, 1940 |
| 2,729,007 | Littman | Jan. 3, 1956 |

FOREIGN PATENTS

| | | |
|---|---|---|
| 465,541 | Germany | Sept. 19, 1928 |